LINEAR VOLTAGE-TO-FREQUENCY CONVERTER

Filed March 14, 1957

2 Sheets-Sheet 1

INVENTOR
J. MAURUSHAT, JR
BY R. B. Ardis
ATTORNEY

LINEAR VOLTAGE-TO-FREQUENCY CONVERTER

Filed March 14, 1957 2 Sheets-Sheet 2

INVENTOR
J. MAURUSHAT, JR
BY R. B. Ardis
ATTORNEY

United States Patent Office 2,924,788

Patented Feb. 9, 1960

2,924,788

LINEAR VOLTAGE-TO-FREQUENCY CONVERTER

Joseph Maurushat, Jr., Millburn, N.J., assignor to Bell Telephone Laboratories, Incorporated, New York, N.Y., a corporation of New York Application March 14, 1957, Serial No. 646,127

16 Claims. (Cl. 332—14)

The present invention relates to variable-frequency wave generators and more particularly to circuit arrangements for generating waves at frequencies which vary under the control of the amplitudes of external signals.

It is sometimes desirable to convert a signal which undergoes a succession of variations in instantaneous amplitude into a corresponding wave which undergoes a similar succession of frequency variations. It has been found, for example, that under some conditions data in binary form may be more conveniently transmitted over a telephone line if it is first transformed into a wave that shifts between two predetermined frequencies which represent the respective marks and spaces.

In the past, one way of converting a signal of varying amplitude into a corresponding wave of varying frequency has been through the use of free-running multivibrators. In the vacuum tube art, it is often possible to control the output frequency of a free-running multivibrator in a substantially linear manner by superimposing the incoming signal of varying amplitude upon one or more of the principal biasing voltages of the multivibrator. When the same technique is attempted in the transistor art, however, it is found that the base current which tends to flow in each transistor even when the transistor is biased for non-conduction tends to introduce serious nonlinearities into the control of the output frequency.

A principal object of the present invention is, therefore, to permit the usual advantages of long life and reduced power and space requirements associated with the use of transistors to be realized in a multivibrator type of circuit for varying the output frequency under the control of amplitude variations of an external signal without any sacrifice in quality of performance.

Another and more particular object is to eliminate the adverse effect of extraneous transistor base current upon the linearity with which the output frequency of a multivibrator type of circuit can be controlled by external signal amplitude variations.

In one of its aspects, the invention takes the form of a wave generator which includes a regenerative transistor circuit having at least one stable state of equilibrium and an arrangement for triggering the regenerative circuit repetitively from an external timing circuit which is isolated from the regenerative circuit except during triggering intervals.

One of the important features of the invention is a triggering circuit which comprises at least one external timing capacitor, means for gradually changing the potential across the timing capacitor from a reference voltage level toward a voltage level fixed by the amplitude of an external signal, and a diode switch for applying the potential across the capacitor when it has reached a predetermined intermediate voltage level to the regenerative circuit to trigger it and cause it to change state. The external signal amplitude thus controls the rate at which the potential across the timing capacitor changes and fixes the output frequency or pulse repetition rate of the regenerative circuit. Because the switching arrangement isolates the timing capacitor from the regenerative circuit except during triggering intervals, this feature of the invention permits transistors to be employed in the regenerative circuit without danger of the base currents which flow in the transistors even when they are biased for nonconduction interfering with the charge on the timing capacitor.

Another important feature of the invention is a transistor switching arrangement which resets the potential across the timing capacitor to the reference voltage level substantially simultaneously with the triggering of the regenerative circuit. The triggering circuit is thereby restored to its original condition, permitting another operating cycle to take place.

In one preferred embodiment of the invention, a bistable transistor multivibrator having a pair of input circuits is utilized as the regenerative circuit and a pair of external timing capacitors are connected to respective ones of the input circuits through a pair of normally reverse-biased diodes. In alternation, each timing capacitor is charged from a reference voltage level toward a voltage level determined by the amplitude of at least one external signal. As soon as each capacitor is charged to a predetermined intermediate voltage level, the associated diode becomes forward biased and trips the multivibrator, causing it to reverse state. Substantially simultaneously with the tripping of the multivibrator, the transistor switching arrangement featured by the invention discharges the timing capacitor to the reference voltage level in order to permit the operating cycle to continue.

Embodiments of the invention which include a bistable multivibrator and dual external timing capacitors may utilize to advantage either one or two external signals. When a single external signal is employed, it is used to control the charging rate of both of the timing capacitors. When separate external signals are employed, they are applied separately to the respective timing capacitors and may be used to secure the additional advantage of permitting the duty cycle of the output pulse train of the multivibrator to be controlled independently of the circuit parameters. The duty cycle is, in accordance with a feature of the invention, controlled simply by changing the ratio between the external signal amplitudes. As long as the ratio is held constant, however, substantially linear control of the output frequency or pulse repetition rate of the multivibrator is maintained.

Other objects and features of the invention will become apparent from a study of the following detailed description of a specific embodiment. In the drawings.

Figure 1:
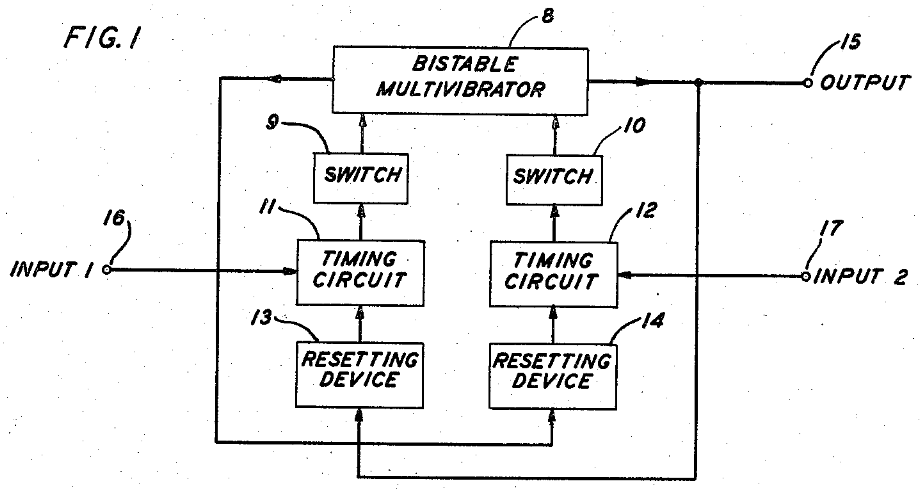
Fig. 1 shows a block diagram illustrating the principles underlying the invention.

Fig. 1 is a block diagram of a circuit illustrating the principles underlying the invention. A bistable circuit 8 has a pair of inputs connected respectively to two switches 9 and 10. Connected to the remaining terminals of respective ones of the switches 9 and 10 are the outputs of two timing circuits 11 and 12. Two resetting devices 13 and 14 are connected to timing circuits 11 and 12, respectively, in order to reset these circuits at the terminations of their timing cycles. The outputs of bistable multivibrator 8 are connected respectively to resetting devices 13 and 14 in order to activate them. A pair of input terminals 16 and 17 are provided for applying input signals of varying amplitude to timing circuits 11 and 12, respectively, and output pulses are made available by an output terminal 15 connected to one of the outputs of bistable multivibrator 8.

In operation, the timing circuits 11 and 12 produce output waves having amplitudes which change at a rate controlled by the instantaneous amplitudes of the input signals. When the output wave from one of the timing circuits 11 or 12 reaches a predetermined amplitude, it is applied by its associated switch 9 or 10 to bistable multivibrator 8 as a triggering signal. The multivibrator 8, when triggered, produces output pulses which are coupled to resetting devices 13 and 14 which, in turn, reset the timing circuit 11 or 12 that has just completed a timing cycle. When the resetting circuits 13 and 14 are activated by the output from multivibrator 8, the remaining timing circuit 11 or 12 starts a similar cycle. In this manner, the timing circuits 11 and 12 are alternately timing so that multivibrator 8 is triggered at intervals determined by the amplitudes of the input potentials.

Figure 2:
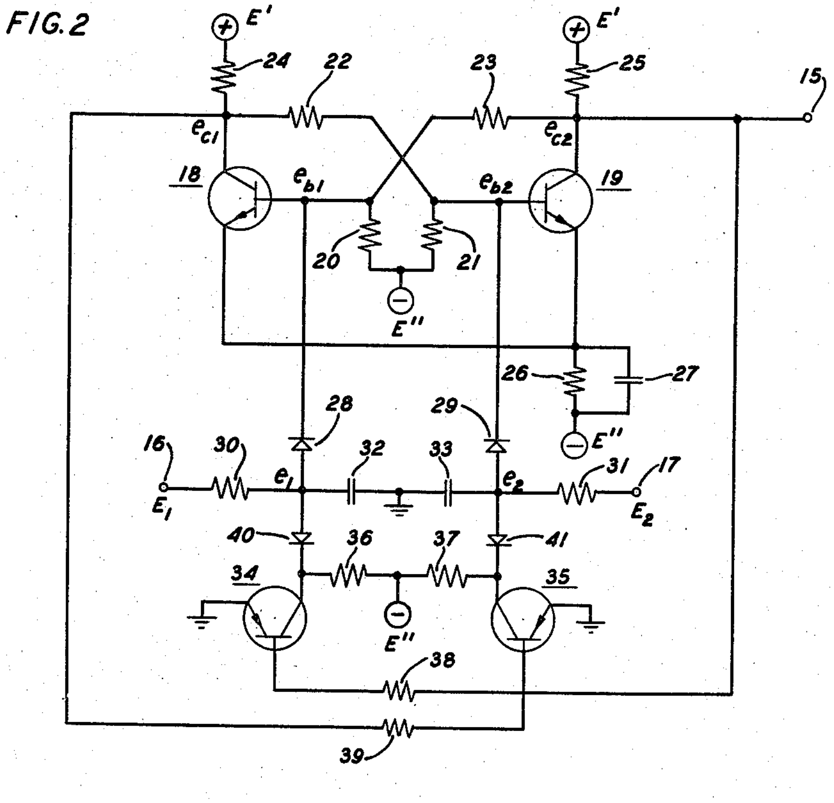
Fig. 2 shows a schematic diagram of one specific embodiment of the invention.

Fig. 2 shows a schematic diagram of one specific embodiment of the invention. The bistable multivibrator circuit 8 comprises two NPN-type transistors 18 and 19, resistors 20 through 26, and capacitor 27. The resistor 26 and the capacitor 27 are parallel connected to form a biasing circuit. One terminal of this parallel circuit is connected to the emitter electrodes of transistors 18 and 19, while the other terminal is connected to a source of negative potential E''. The resistors 20 and 21 are connected between the negative source E'' and the base electrodes of transistors 18 and 19, respectively. The resistor 22 is cross-connected between the collector electrode of transistor 18 and the base electrode of transistor 19, while the resistor 23 is cross-connected between the collector electrode of transistor 19 and the base electrode of transistor 18. The resistors 24 and 25 are connected between a source of positive potential E' and the collector electrodes of transistors 18 and 19, respectively.

A pair of diodes 28 and 29, which comprise switches 9 and 10 of Fig. 1, are connected to the base electrodes of transistors 18 and 19, respectively, and poled so that the direction of easy current flow is toward transistors 18 and 19.

The timing circuit 11 comprises a resistor 30 and a capacitor 32 connected in series, while the timing circuit 12 comprises a resistor 31 and a capacitor 33 connected in series. The junction of resistor 30 and capacitor 32 is connected to the remaining electrode of diode 28, while the junction of resistor 31 and capacitor 33 is connected to the remaining electrode of diode 29. The remaining terminals of capacitors 32 and 33 are connected to ground, and the remaining terminals of resistors 30 and 31 are connected to signal input terminals 16 and 17, respectively.

The resetting devices 13 and 14 comprise PNP-type transistors 34 and 35, resistors 36 through 39, and diodes 40 and 41. The emitter electrodes of transistors 34 and 35 are grounded and resistors 36 and 37 are connected between negative source E'' and the collector electrodes of transistors 34 and 35, respectively. The diode 40 is connected between the collector electrode of transistor 34 and the junction of resistor 30 and capacitor 32, while the diode 41 is connected between the collector electrode of transistor 35 and the junction of resistor 31 and capacitor 33. The diodes 40 and 41 are connected so that when forward biased, the direction of conventional current flow is toward transistors 34 and 35, respectively. The resistor 38 is connected between the base electrode of transistor 34 and the collector electrode of transistor 19, while the resistor 39 is connected between the base electrode of transistor 35 and the collector electrode of transistor 18.

Figure 3A:
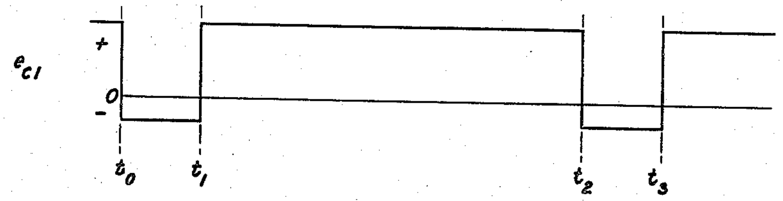
Figs. 3A through 3F illustrate waveforms appearing at various points within the embodiment shown in Fig. 2.
Figure 3B:
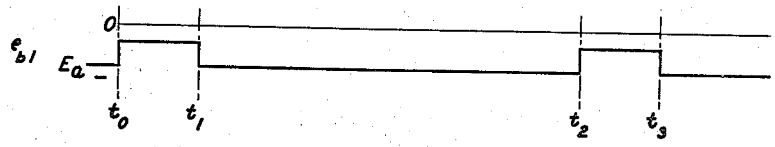
Figure 3C:
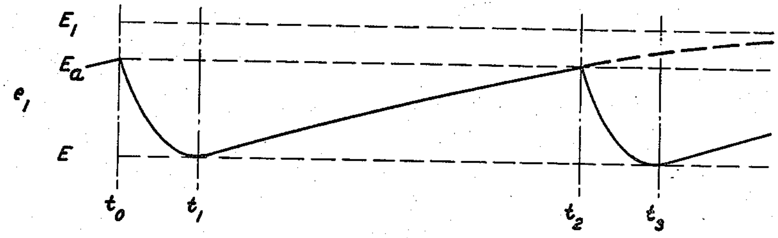
Figure 3D:
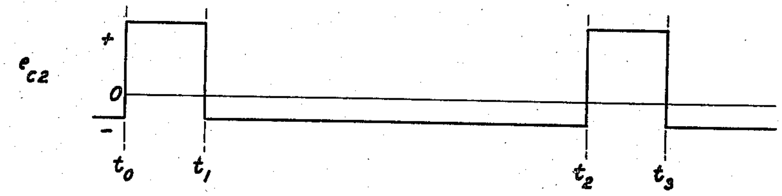
Figure 3E:
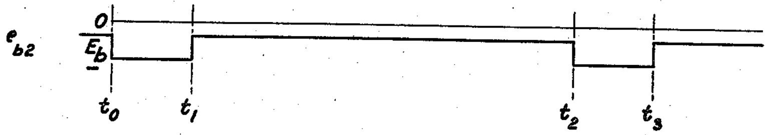
Figure 3F:
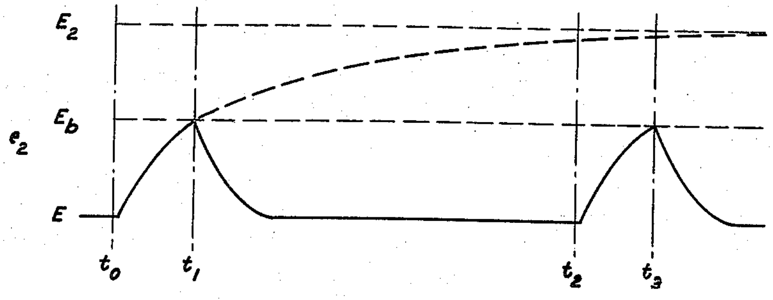

For symmetrical circuitry, the operation of the embodiment shown in Fig. 2 is illustrated by the waveforms shown in Figs. 3A through 3F. Figs. 3A and 3D show the waveforms of the collector electrode voltages $e_{c1}$ and $e_{c2}$ of transistors 18 and 19; Figs. 3B and 3E show the waveforms of the base electrode voltages $e_{b1}$ and $e_{b2}$ of transistors 18 and 19; and Figs. 3C and 3F show the waveforms of the voltages $e_1$ and $e_2$ across the capacitors 32 and 33. $E_1$ and $E_2$ represent the potential levels of input signals (where $E_2$ is greater than $E_1$), and $E_a$ and $E_b$ represent the potential levels of voltages $e_1$ and $e_2$, respectively, necessary for triggering multivibrator 8. E represents the reference potential levels of voltages $e_1$ and $e_2$, respectively, to which timing circuits 11 and 12 are reset.

Prior to the time $t_0$, shown in Figs. 3A through 3F, transistors 18 and 35 are in the Off state, transistors 19 and 34 are in the On state, capacitor 33 rests at the reference potential level E (diode 29 being reverse biased), and capacitor 32 is charging through resistor 30 toward the potential level $E_1$. When the potential level of the voltage $e_1$ reaches the intermediate level $E_a$ at the time $t_0$ (Fig. 3C), diode 28 is forward biased and transistor 18 switches to the On state (Fig. 3A), which immediately switches transistor 19 to the Off state because of the cross-coupling provided by resistor 22 (Fig. 3E). The voltage $e_{c2}$ on the collector electrode of transistor 19 (Fig. 3D) is cross-coupled to the base of transistor 18 (Fig. 3B), which maintains this transistor in the On state. The voltage $e_{c2}$ is also coupled to the base of transistor 34 to switch it from the On state to the Off state, and the voltage $e_{c1}$ is also coupled to the base of transistor 35 to switch it from the Off state to the On state. Because the polarity of voltage source E'' is negative, the potential levels of the voltages on the collector electrodes of transistors 34 and 35 are negative when their respective transistors are in the Off state (in the On state, they are essentially at ground potential). When the potential level of the voltage on the collector electrode of either of transistors 34 and 35 is negative, its associated diode switch 40 or 41 is forward biased, and capacitor 32 or 33 of timing circuit 11 and 12 connected to it is discharged. At time $t_0$, therefore, transistor 34 is switched Off and capacitor 32 is discharged through diode 40 and resistor 36. This is illustrated in Fig. 3C between times $t_0$ and $t_1$. Diode 41, which was previously forward biased, is reverse biased at time $t_0$, which permits capacitor 33 to accumulate a charge through resistor 31. This is illustrated in Fig. 3F between times $t_0$ and $t_1$. When the potential level of voltage $e_2$ reaches $E_b$ at time $t_1$, diode 29 is forward biased and transistor 19 is switched On, which causes transistors 18 and 35 to switch Off and transistor 34 to switch On. Diode 40 is now reverse biased and diode 41 is forward biased. Capacitor 33 is discharged to its reset or reference level E and capacitor 32 starts to charge-up toward $E_1$. Because of the cross-coupling provided by resistors 22 and 23, each of the diodes 28 and 29 is reverse biased at all times except when the potential level of the voltage across its capacitor 32 or 33 is sufficient to initiate a change in the state of multivibrator 8. When this occurs, the diode 28 or 29 is forward biased until transistor 18 or 19 in the other half of the multivibrator circuit 8 is switched Off. Because diodes 28 and 29 are reverse biased at all times except during triggering intervals, timing capacitors 32 and 33 are isolated from transistors 18 and 19 so that the base currents which flow in these transistors when they are biased for nonconduction do not interfere with the charge on the capacitors.

In the foregoing discussion of the invention, the description of operation was predicated upon circuit symmetry and the application of different signal voltages to the input terminals 16 and 17. The duty cycle of the output of multivibrator 8 is controlled simply by changing the ratio between the external signal amplitudes. As long as the ratio is held constant, substantially linear control of the output frequency or pulse repetition rate of multivibrator 8 is maintained. As has already been noted, a single input signal may be applied to both input terminals simultaneously, in which case the frequency or repetition rate of the output pulses is linearly related to the instantaneous amplitude of this single input signal.

Although only one embodiment of the invention has been described in detail, it is to be understood that various other embodiments may be devised by those skilled in the art without departing from the spirit and scope of the invention.

What is claimed is:

1. In combination, a regenerative circuit having at least stable one state of equilibrium and means for triggering said regenerative circuit repetitively at a rate determined by the instantaneous amplitude of an external signal, said means comprising a timing capacitor, means for changing the potential across said timing capacitor from a first predetermined voltage level in the direction toward a second voltage level at a rate determined by the amplitude of said external signal, switching means for triggering said regenerative circuit substantially simultaneous with the arrival of said potential at said second voltage level, said switching means isolating said timing capacitor from said regenerative circuit between triggering intervals, and means for returning said potential across said timing capacitor to said first level substantially simultaneously with the triggering of said regenerative circuit.

2. In combination, a regenerative circuit having two stable states of equilibrium and means for triggering said regenerative circuit back and forth between said states at a rate determined by the instantaneous amplitude of an external signal, said means comprising a timing capacitor, means for changing the potential across said timing capacitor from a first predetermined voltage level in the direction toward a second voltage level at a rate determined by the amplitude of said external signal, diode switching means for applying said potential substantially simultaneous with its arrival at said second voltage level to said regenerative circuit for triggering it from one to the other of said states, said switching means isolating said timing capacitor from said regenerative circuit between triggering intervals, and switching means for returning said potential to said first level substantially simultaneously with the change of state of said regenerative circuit.

3. In combination, a bistable multivibrator having a pair of input circuits and means for triggering said multivibrator back and forth between its two stable states of equilibrium at a rate determined by the instantaneous amplitudes of two external signals which comprises a pair of timing capacitors external to said multivibrator, means for changing the potentials across each of said timing capacitors in alternation from first predetermined voltage levels in the direction toward respective second voltage levels at rates determined by respective ones of said external signals, diode switching means respectively interconnecting said timing capacitors and said input circuits to trigger said multivibrator from one to the other of its said states substantially simultaneous with the arrival of the potential across either of said timing capacitors at its respective one of said second voltage levels, said switching means isolating each of said input circuits from its respective one of said timing capacitors between triggering intervals, and transistor switching means for restoring the potential across either of said timing capacitors from said second level to said first level substantially simultaneously with the change of state of said multivibrator.

4. A combination in accordance with claim 3 in which said first voltage levels are substantially the same for both of said timing capacitors.

5. A combination in accordance with claim 4 in which said two external signals are substantially identical and said second voltage levels are substantially the same for both of said timing capacitors.

6. Apparatus for generating a wave having a repetition rate determined by the amplitude of an external signal comprising a regenerative circuit having at least one stable state of equilibrium, timing means for producing a triggering potential which reaches a predetermined voltage level after an interval substantially proportional to the amplitude of said external signal, switching means for applying said triggering potential to said regenerative circuit substantially simultaneous with its arrival at said predetermined level at the end of said interval, and means operative after said interval for returning said timing means to its condition at the beginning of said interval.

7. Apparatus for generating a wave having a repetition rate determined by the amplitude of an external signal comprising a regenerative circuit having two stable states of equilibrium, timing means for producing a triggering potential which reaches a predetermined voltage level after an interval substantially proportional to the amplitude of said external signal, switching means for applying said triggering potential to said regenerative circuit substantially simultaneous with the end of said interval for triggering it from one to the other of said states, and means operative after said interval for returning said timing means to its condition at the beginning of said interval.

8. Apparatus for generating a wave having a repetition rate determined by the amplitudes of two external signals comprising a bistable circuit having a pair of input circuits, a timing circuit for each of said input circuits for producing a triggering potential which reaches a predetermined voltage level after an interval determined by a respective one of said external signals, switching means for applying each of said triggering potentials substantially simultaneous with the end of its respective said interval to its respective one of said input circuits for triggering said bistable circuit from one to the other of its stable states of equilibrium, and transistor switching means for resetting each of said timing circuits after its respective said interval to its condition at the beginning of its respective said timing interval.

9. Apparatus for generating a wave having a repetition rate which is a function of the amplitudes of external signals comprising a bistable circuit having a pair of input circuits and a pair of output circuits, a timing circuit for each of said input circuits for producing a triggering potential which reaches a predetermined voltage level after an interval determined by the amplitude of an external signal, first switching means for applying each of said triggering potentials after its respective said interval to its respective one of said input circuits for triggering said bistable circuit from one to the other of its stable states of equilibrium, and resetting means for restoring each of said timing circuits after its respective said interval to its condition at the beginning of said interval, said resetting means including a source of reference potential, second switching means for connecting said source to respective ones of said timing circuits, and third switching means responsive to the state of equilibrium of said bistable circuit for operating said second switching means.

10. Apparatus in acccordance with claim 9 wherein said first switching means comprises a pair of diodes each poled to isolate a respective one of said timing circuits from said bistable circuit except when its triggering potential reaches said predetermined voltage level.

11. Apparatus in accordance with claim 10 wherein said second switching means comprises a pair of diodes and said third switching means comprises a pair of transistor switches each connected to operate said second switching means by forward biasing a respective one of its diodes.

12. Apparatus in accordance with claim 11 wherein said third switching means comprises a pair of transistors each having three electrodes, circuit means connecting two of the electrodes of each of said transistors to said source of reference potential, circuit means connecting one of said two electrodes of each of said transistors to its associated diode in said second switching means, and circuit means connecting the remaining electrode of each of said transistors to a respective one of said bistable circuit output circuits so that each of said diodes of said second switching means is forward biased when the associated transistor is in a substantially nonconducting state and reverse biased when the associated transistor is in a conducting state.

13. Apparatus for generating a wave having a repetition rate which is a function of the amplitudes of external potentials comprising a bistable circuit having two input and two output circuits, a pair of timing circuits each comprising a resistor and a capacitor connected in a series arrangement, means for applying said external potentials across said series arrangements, a first pair of diodes respectively connected between said bistable circuit input circuits and said capacitors and poled to isolate said capacitors during their timing cycles, a source of reference potential, a pair of transistors each having three electrodes, circuit means connecting two of said electrodes of each of said transistors to said source of reference potential, a second pair of diodes respectively connected between said capacitors and said two electrodes of each of said transistors, and means respectively connecting said output circuits to combinations of said electrodes of each of said transistors comprising the remaining one of said electrodes and one of said two electrodes.

14. Apparatus for generating a wave having a repetition rate which is a function of the amplitudes of external potentials comprising a bistable circuit comprising two transistors each having emitter, collector and base electrodes, a source of potential, circuit means connecting said collector and base electrodes to said source in a reverse biased sense, circuit means cross-connecting the collector and base electrodes of both of said transistors, and circuit means connecting said emitter electrodes to said source to reverse bias the emitter and base electrodes of each of said transistors when the emitter and base electrodes of the other of said transistors are forward biased, a pair of timing circuits for producing potentials which reach predetermined amplitudes after intervals determined by the amplitudes of said external potentials, switching means for applying said potentials substantially simultaneous with their arrival at said predetermined amplitudes to respective ones of said base electrodes, and resetting means respectively connected between said collector electrodes and said timing circuits for returning said timing circuits to their conditions at the beginning of said intervals.

15. Apparatus in accordance with claim 14 wherein each of said switching means comprises a diode poled to isolate its associated timing circuit during its timing cycle.

16. Apparatus in accordance with claim 15 wherein each of said timing circuits comprises a resistor and capacitor connected in a series arrangement.

References Cited in the file of this patent

UNITED STATES PATENTS

| | | |
|---|---|---|
| 2,644,887 | Wolfe | July 7, 1953 |
| 2,673,936 | Harris | Mar. 30, 1954 |
| 2,724,780 | Harris | Nov. 22, 1955 |
| 2,816,237 | Hageman | Dec. 10, 1957 |